United States Patent [19]
Waldorf

[11] 3,792,327
[45] Feb. 12, 1974

[54] HYBRID ELECTRICAL VEHICLE DRIVE

[76] Inventor: Lindsey Earl Waldorf, 3888 Loch Alpine Dr., Ann Arbor, Mich. 48103

[22] Filed: Oct. 5, 1972

[21] Appl. No.: 295,052

[52] U.S. Cl. ............... 318/139, 290/16, 290/50, 320/62
[51] Int. Cl. .................... H02p 5/16, B60l 11/02
[58] Field of Search ........ 290/9, 16, 50, 30; 307/64, 307/66; 318/139; 320/62

[56] References Cited
UNITED STATES PATENTS

| | | | |
|---|---|---|---|
| 3,503,464 | 3/1970 | Yardney | 290/16 |
| 3,515,968 | 6/1970 | Crawford | 290/16 |
| 3,556,239 | 1/1971 | Spahn | 290/9 |
| 3,719,881 | 3/1973 | Shibata | 320/62 |
| 1,582,825 | 4/1926 | Kellogg | 290/30 |
| 3,205,965 | 9/1965 | Roth | 290/9 |

Primary Examiner—Bernard A. Gilheany
Assistant Examiner—Thomas Langer
Attorney, Agent, or Firm—Fisher, Krass, Young & Gerhardt

[57] ABSTRACT

A vehicle electric drive is provided including a traction motor powered by a battery or, alternatively, by a constant power generator. When the voltage on the battery is above a first predetermined level the battery alone supplies electric power to the motor. When the battery voltage falls below a second predetermined level, a switch sensing the battery voltage starts an internal combustion engine to drive the generator; the power from the generator is effective to supply the traction motor and, simultaneously, recharge the battery. The recharging power applied to the battery equals the difference between the fixed power from the generator and the variable power to the traction motor. When the engine is running, it operates under the constant load of the generator; the engine is also operated at a constant speed. This constant speed-constant load engine operation permits the engine to be designed and adjusted to minimize exhaust pollutants.

12 Claims, 4 Drawing Figures

3,792,327

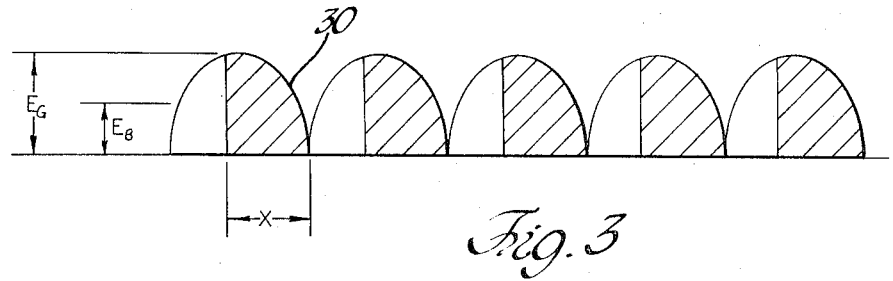
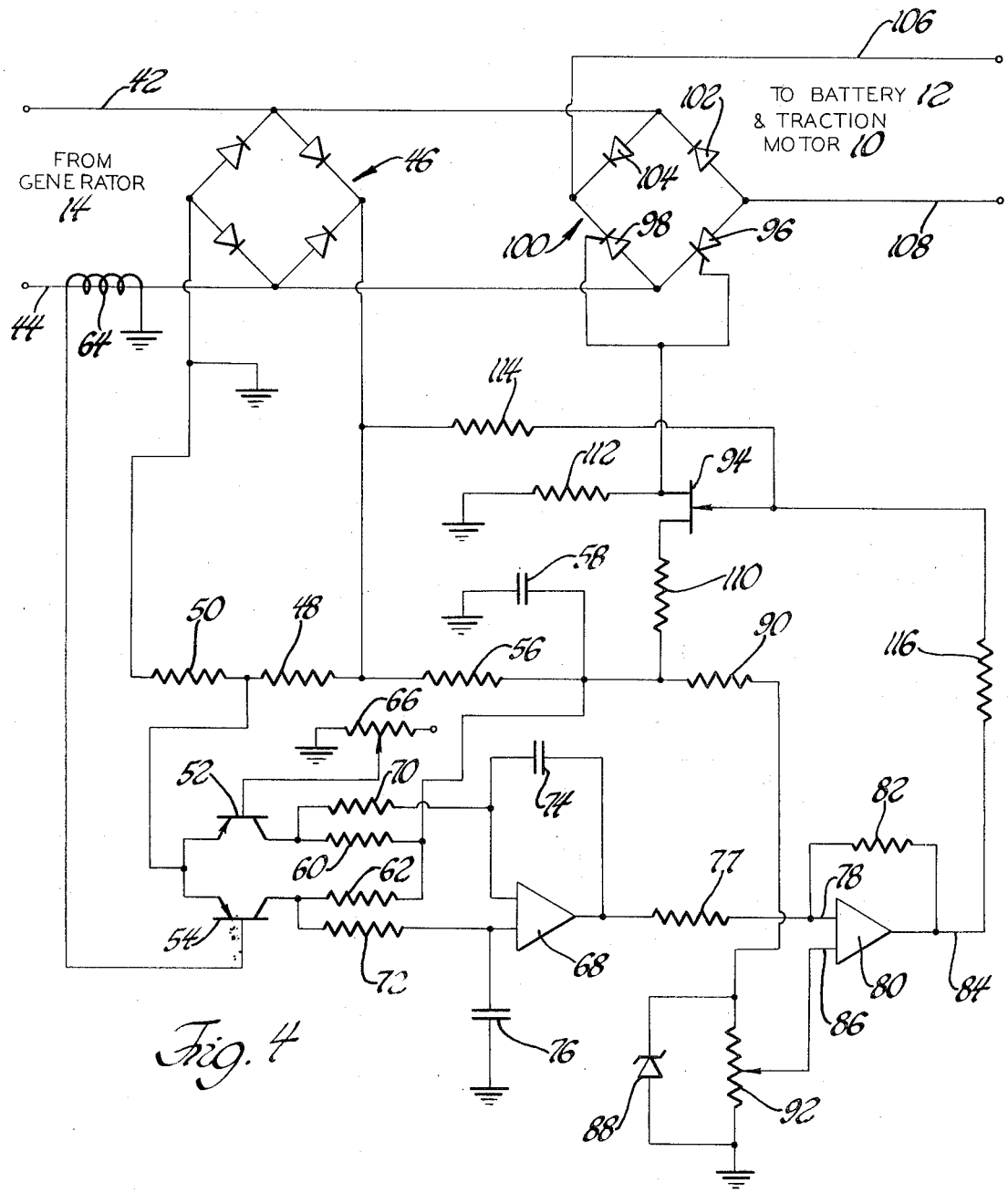

HYBRID ELECTRICAL VEHICLE DRIVE

This invention relates to a hybrid vehicle electric drive.

Contemporary environmental concern is the genesis of rigorous exhaust emissions standards for engines in passenger vehicles. To date certain pollutants in exhaust emissions have been reduced at the cost of an increase in other pollutants. For example carbon monoxide and hydrocarbon emissions have been reduced with a resulting increase in nitric oxide emissions. However, government standards slated for the future are more rigorous, and it will, therefore, be necessary to advance the present art of pollution control.

Passenger car manufacturers have long experimented with electric drives for their vehicles. This form of propulsion system has received renewed attention with the advent of emission control standards. From the standpoint of vehicle emissions, a battery-powered electric drive is an ideal, for it is pollution free. However, a battery-powered electric drive is not a practical alternative at present in view of the associated high cost, great weight, and limited driving range.

In the present invention a hybrid system is used to secure the advantages of conventional internal combustion engine systems without the liability of high emission, while at the same time obtaining the advantages of conventional electric drive arrangements with a significant reduction in cost and weight and an increase in driving range. The hybrid system includes a traction motor powered by a battery or, alternatively, by a constant-power generator. When the voltage on the battery is above a first predetermined level the battery alone supplies electric power to the motor. When the battery voltage falls below a second predetermined level, a switch sensing the battery voltage starts an internal combustion engine to drive the generator; the power from the generator is effective to supply the traction motor and, simultaneously, recharge the battery. The recharging power applied to the battery equals the difference between the fixed power from the generator and the variable power to the traction motor. When the engine is running, it operates under the constant load of the generator; the engine is also operated at a constant speed. This constant speed-constant load engine operation permits the engine to be designed and adjusted to minimize exhaust pollutants.

The instant invention can be best understood by reference to the following description of a preferred embodiment taken in connection with the accompanying drawings, in which:

FIG. 3 is a graph showing the firing angle control utilized to regulate the power from the generator of FIG. 1; and FIG. 4 is a circuit schematic of the power controller connected at the output of the generator of FIG. 1.

Figure 1:
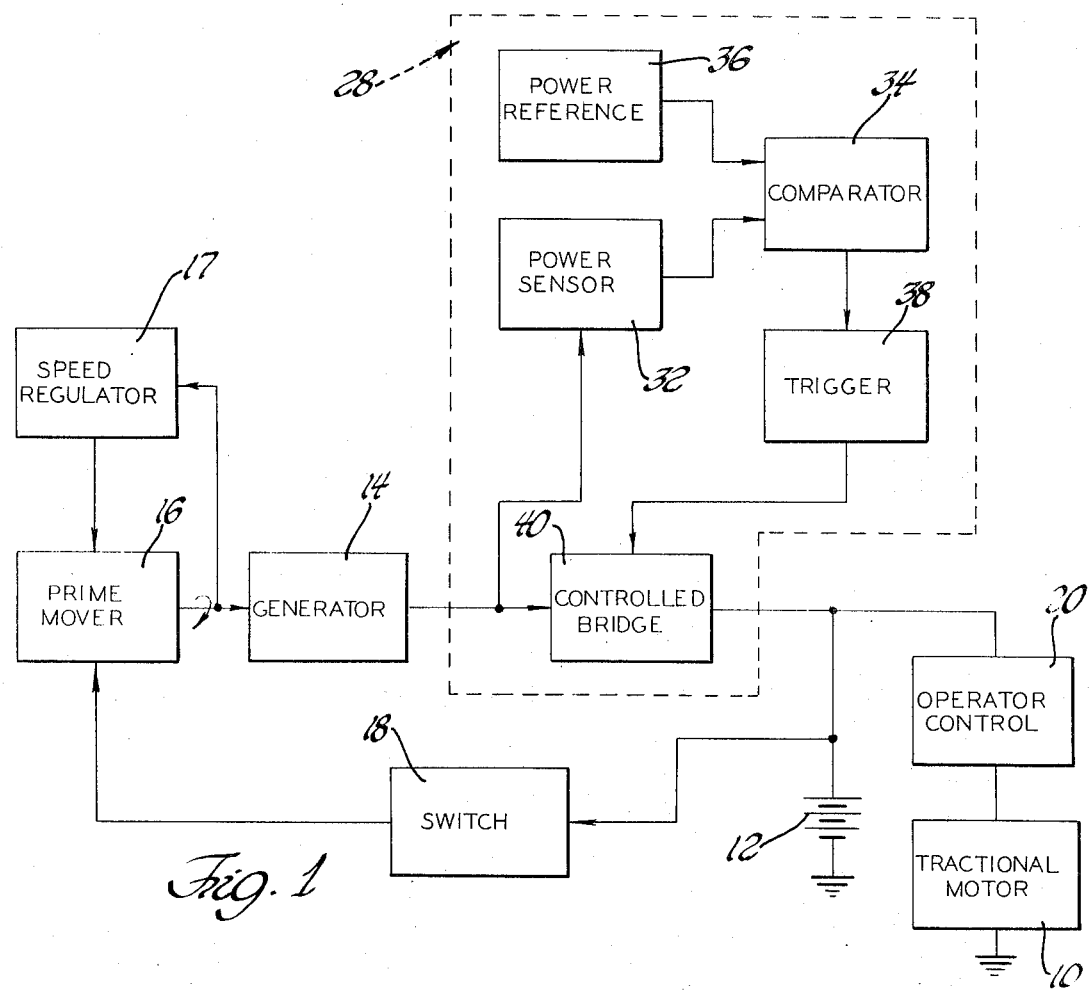
FIG. 1 is a schematic in block form of the hydrid vehicle electric drive of the present invention.

Reference should now be made to the drawings and more particularly to FIG. 1 wherein the hybrid vehicle electric drive of the present invention is shown schematically in block form. A traction motor 10 is connected to be supplied from a battery 12, and a generator 14 is electrically coupled with both the motor 10 and the battery 12. When the generator 14 is operating, it supplies a substantially constant power output to the motor 10 and the battery 12. An engine or prime mover 16 in the form of a conventional internal combustion engine is drivingly coupled with the generator 14 to controllably drive the generator. Inasmuch as the generator 14 develops a constant power output, it should be appreciated that the prime mover 16 runs under a substantially constant load. A conventional speed regulator 17 controls the speed of operation of the prime mover 16 such that, during operation, the prime mover also operates at a substantially constant speed. THe regulator 17 senses the output speed of the prime mover to develop closed loop control of the speed.

A voltage regulator or switch 18 is connected to the prime mover 16 to turn the prime mover on and off in response to the voltage on the battery 12. The switch 18 can take various forms within the skill of the art including, in a simple embodiment, a relay controlled starting circuit for the prime mover 16. The switch 18 monitors the voltage of the battery 12 and develops a control signal to turn the prime mover 16 on and off in accordance with the battery voltage. When the voltage on the battery 12 is above a first, predetermined level, the switch 18 is effective to preclude operation by the prime mover 16; on the other hand, when the voltage on the battery 12 is below a second, lower predetermined level for a minimum time (the minimum time requirement is a design factor necessary to obviate spurious starts), the switch 18 is operative to turn the prime mover 16 on.

Figure 2:
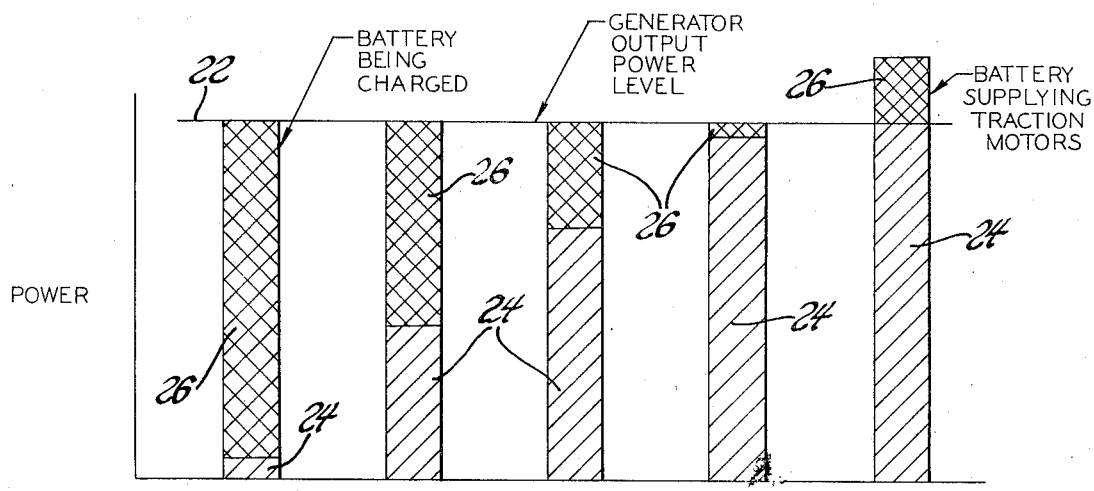
FIG. 2 is a graph showing the division of power from the generator of FIG. 1 under different operating conditions.

A conventional operator control 20 is connected at the input of the motor 10 to afford operator control of the power level to the motor 10. During intervals of operation by the prime mover 16, the operator control 20 regulates the power from the generator 14 to the motor 10, and the balance of the power from the generator 14 is supplied to the battery 12 as charging current. This power distribution is illustrated graphically in FIG. 2. The substantially constant power level from the generator 14 is indicated by a line 22. When the operator control 20 is set for low power to the motor 10, the power to the battery 12 approaches the total power available from the generator 14. The areas 24 on the bar graph represent the power to the traction motor 10 at different demand settings of the operator control 20. The associated areas 26 represent the resulting power to the battery 12 at the respective control settings of the operator control 20. As is evident from the graph, the power to the traction motor 10 is a variable dependent on the setting of the operator control 20, and the power to the battery 12 is the difference between the constant power from the generator 14 and the variable power to the traction motor 10. When the generator 14 is operating a sudden power demand from the motor, caused by a sudden depression of the accelerator, may momentarily draw the full generator output plus a flow from the battery.

The block schematic of FIG. 1 includes a means 28 connected between the generator 14 and the operator control 20 for controlling the power supplied to the operator control 20 from the generator 14. The current at a given voltage at the output of the means 28 is determined by the load presented by the battery 12 and the demand set by the operator control 20 for the traction motor 10. Accordingly, the power from the generator 14 is readily regulated by controlling the voltage at the output of the means 28 in accordance with conventional pulse width modulation techniques.

The power control means 28 provides firing angle control of the type illustrated in the graph of FIG. 3. A full-wave rectified sinusoid 30 is illustrated in FIG. 3 with a maximum voltage level $E_G$. This sinusoid 30 is a representation of the rectified output from the generator 14. The nominal voltage of the battery 12 is represented on the graph as $E_B$; it is evident that the nominal battery voltage is substantially less than the maximum voltage from the generator 14. Control of the voltage level at the output of the power control means 28 is accomplished according to known principles by controlling the conduction angle X in each half-cycle of the waveform 30.

The power control means 28 regulates the conduction angle X to maintain the power from the generator 14 at a substantially constant level. A power sensor 32 monitors the power supplied by the generator 14. A comparator 34 compares the actual power from the generator 14 with a reference power from a power reference 36. The comparator develops a signal from a trigger 38 which controls a controlled bridge 40. The trigger signals from the trigger 38 control the conduction angle X to thereby control the power level of the generator 14. If the power from the generator 14 increases, the triggers are retarded such that the control angle X is reduced to thereby reduce the power from the generator 14. On the other hand, if the power from the generator 14 decreases, the trigger 38 is effective to advance the timing of the trigger signals to the controlled bridge 40 to thereby increase the conduction angle X to increase the power from the generator 14.

A circuit schematic for the power control means 28 is set forth in FIG. 4. Lines 42 and 44 carry voltage and current from the generator 14. A diode bridge 46 provides full-wave rectification of the voltage between lines 42 and 44, and a voltage divider comprising resistors 48 and 50 develops a control signal correlated with the voltage between lines 42 and 44 for connection with the emitters of transistors 52 and 54. An RC filter comprising a resistor 56 and a capacitor 58 provides a filtered bias voltage for connection through resistors 60 and 62 to the collectors of transistors 52 and 54, respectively. A coil 64 develops a signal proportional to the current in the lines 42 and 44 for connection to the base of transistor 54. The base of transistor 52 is connected through a resistor 66 to ground. The circuit including the transistors 52 and 54 provide an output voltage proportional to the product of the voltage and current of the lines 42 and 44: the voltage between the collectors of transistors 52 and 54 is proportional to the power transferred on the lines 42 and 44 from the generator 14.

The power signal from the collectors of transistors 52 and 54 is amplified and integrated by the operational amplifier 68 and the associated resistors 70 and 72 and the capacitors 74 and 76. This amplified average power is connected through a resistor 77 to the input 78 of an operational amplifier 80 having a feedback resistor 82 such that the output voltage on line 84 seeks a level to eliminate the voltage difference between the input 78 and the input 86. Accordingly, the output from the operational amplifier 80 on the line 84 is a signal having a polarity and amplitude such that the combination of that signal with the signal through resistor 77 from the operational amplifier 68 equals a reference power signal applied to the terminal 86. Thus, if the reference power at input 86 exceeds the actual power at input 78, the signal on line 84 will have a positive polarity and an amplitude proportional to the difference between the reference power and the actual power. On the other hand, if the signal at the input 78 exceeds the signal at the input 86, the signal on the line 84 will have a negative polarity and an amplitude proportional to the difference between the reference power and the actual power.

The input 86 is supplied a signal correlated with the desired constant power level for the generator 14. The filtered voltage from the RC filter comprising the resistor 56 and the capacitor 58 is applied to a Zener diode 88 through a resistor 90. A tapped resistor 92 constitutes a voltage divider developing the required power-reference signal for the input 86 of the operational amplifier 80.

A unijunction transistor 94 develops trigger signals for controlled switches or controlled rectifiers 96 and 98 in a controlled bridge generally designated 100. Commutation circuitry which might be required for switches 96 and 98 is within the skill of the art and, therefore, it is not illustrated on the drawing. Diodes 102 and 104 coact with the controlled switches 96 and 98 to supply output power on lines 106 and 108 to the battery 12 and the traction motor 10. Bias voltage is applied to the unijunction transistor 94 through resistors 110 and 112. The full-wave rectified voltage from bridge 46 is connected with the emitter of the unijunction transistor 94 through a resistor 114. This full-wave rectified voltage is added to the voltage on line 84 connected to the emitter of the unijunction 94 through a resistor 116. An increase in the voltage on the line 84 connected through the resistor 116 advances the time in the respective half-cycle at which a firing signal is developed by the unijunction transistor 94. Accordingly, the signal on line 84 is effective to regulate the angle X of FIG. 3 to, thereby, regulate the power available on lines 106 and 108.

Although the foregoing has proceeded in terms of a particular preferred embodiment, it is to be understood that various changes and modifications could be engrafted thereon by one skilled in the art within the spirit and scope of the appended claims.

The embodiments of the invention in which an exclusive property or privilege is claimed are defined as follows:

1. A vehicle propulsion system comprising:
   a traction motor; a battery electrically connected to said traction motor; a generator having its output connected to said traction motor and siad battery to power said traction motor and to supply charging current to said battery; a prime mover drivingly connected to said generator; means for maintaining the speed of the prime mover at a constant level when said prime mover is on; and means connected with the output of said generator for regulating the power of said generator and maintaining that power at a substantially constant level.

2. A system as in claim 1, including a switch to turn said prime mover on and off.

3. A system as in claim 2, wherein said switch monitors the voltage on said battery and turns said prime mover on and off in accordance therewith.

4. A system as in claim 1, including an operator control regulating the power to said traction motor.

5. A system as in claim 1, wherein said means for regulating the power of said generator comprises controlled switches in a bridge connected at the output of said generator, means for sensing the power from said generator, means for developing a reference power signal, means for comparing said reference power signal with the sensed power from said generator, and means controlled by said means for comparing to controllably switch said controlled switches in said bridge.

6. A system as in claim 1, including a switch to turn said prime mover on and off.

7. A system as in claim 6, wherein said switch monitors the voltage on said battery and turns said prime mover on and off in accordance therewith.

8. A system as in claim 7, including an operator control regulating the power to said traction motor.

9. A system as in claim 8, wherein said prime mover comprises an internal combustion engine.

10. A system as in claim 9, wherein said means for regulating the power of said generator comprises controlled switches in a bridge connected at the output of said generator, means for sensing the power from said generator, means for developing a reference power signal, means for comparing said reference power signal with the sensed power from said generator, and means controlled by said means for comparing to controllably switch said controlled switches in said bridge.

11. A system as in claim 10, wherein said traction motor is supplied power from said battery when said internal combustion engine is off and wherein said traction motor is supplied power from said generator when said internal combustion engine is on.

12. A vehicle propulsion system comprising: an electric traction motor; a storage battery electrically connected to said traction motor; a generator; a prime mover drivingly connected to said generator; means for controlling the operative state of the prime mover as a function of the state of charge of the battery; means for maintaining the speed of the prime mover at a constant level when said prime mover is in an operative state; and power control means for receiving the electrical output of the generator and providing it to the battery and the traction motor, said power control means being operative to maintain the power provided by the generator to the battery and the prime mover at a constant value at such time as the generator is operative.

* * * * *